United States Patent
Sczomak et al.

(10) Patent No.: US 8,989,989 B2
(45) Date of Patent: Mar. 24, 2015

(54) SYSTEM AND METHOD FOR CONTROLLING FUEL INJECTION IN AN ENGINE BASED ON PISTON TEMPERATURE

(75) Inventors: David P. Sczomak, Troy, MI (US); Jonathan T. Shibata, Whitmore Lake, MI (US); Joshua D. Cowgill, Hartland, MI (US)

(73) Assignee: GM Global Technology Operations LLC, Detroit, MI (US)

(*) Notice: Subject to any disclaimer, the term of this patent is extended or adjusted under 35 U.S.C. 154(b) by 267 days.

(21) Appl. No.: 13/613,514

(22) Filed: Sep. 13, 2012

(65) Prior Publication Data

US 2014/0074381 A1 Mar. 13, 2014

(51) Int. Cl.
*F02D 41/04* (2006.01)
*F02D 41/40* (2006.01)
*F02D 41/14* (2006.01)

(52) U.S. Cl.
CPC ............. *F02D 41/401* (2013.01); *F02D 41/14* (2013.01)
USPC .......................................... 701/105; 123/689

(58) Field of Classification Search
CPC ............... F02D 41/401; F02D 41/402; F02D 2041/389; F02D 41/04; F02D 41/14
USPC .......... 701/105, 104, 102, 103; 123/689, 299, 123/300, 304, 41.02
See application file for complete search history.

(56) References Cited

U.S. PATENT DOCUMENTS

| | | | | |
|---|---|---|---|---|
| 6,691,676 | B2* | 2/2004 | Konno | 123/339.24 |
| 2009/0100921 | A1* | 4/2009 | Mc Lain et al. | 73/114.31 |
| 2010/0292909 | A1* | 11/2010 | Gwidt et al. | 701/103 |
| 2011/0246048 | A1* | 10/2011 | Fujii et al. | 701/104 |
| 2013/0139768 | A1* | 6/2013 | Takemoto | 123/41.02 |

FOREIGN PATENT DOCUMENTS

JP 2009103106 A * 5/2009

OTHER PUBLICATIONS

JP2009103106A (Ashizawa, Takeshi) May 14, 2009 (machine translation). [online] [retrieved on Aug. 3, 2014]. Retrieved from: JPO using internet <URL: http://www.ipdl.inpit.go.jp/homepg_e.ipdl>.*
U.S. Appl. No. 14/520,699, filed Oct. 22, 2014, Levy et al.

* cited by examiner

*Primary Examiner* — Mahmoud Gimie

(57) ABSTRACT

A system according to the principles of the present disclosure includes a temperature estimation module and a fuel control module. The temperature estimation module estimates a piston temperature associated with a cylinder based on engine operating conditions. The fuel control module controls at least one of injection timing associated with the cylinder, injection pressure associated with a cylinder, injection location associated with a cylinder, and a number of injections per engine cycle associated with the cylinder based on the piston temperature.

22 Claims, 4 Drawing Sheets

SYSTEM AND METHOD FOR CONTROLLING FUEL INJECTION IN AN ENGINE BASED ON PISTON TEMPERATURE

FIELD

The present disclosure relates to systems and methods for controlling fuel injection in an engine based on piston temperature.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle valve, which adjusts a throttle area to control air flow into the engine. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Exhaust gas passing through an exhaust system may include particulate matter. Exhaust components, such as particulate filters, have been developed to filter the particulate matter. These components, however, increase the cost and mass of a vehicle.

SUMMARY

A system according to the principles of the present disclosure includes a temperature estimation module and a fuel control module. The temperature estimation module estimates a piston temperature associated with a cylinder based on engine operating conditions. The fuel control module controls at least one of injection timing associated with the cylinder, injection pressure associated with a cylinder, injection location associated with a cylinder, and a number of injections per engine cycle associated with the cylinder based on the piston temperature.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

When fuel contacts a cold piston, the fuel forms puddles on the piston. Combustion of the fuel puddles on the piston causes particulate matter to form. Thus, the amount of particulate matter produced by an engine may be greater when pistons in the engine are cold as compared to when the pistons are at a typical operating temperature. The pistons may be cold after fuel injection in the engine is stopped. Fuel injection may be stopped when the engine is decelerating to improve fuel economy.

An engine control system and method according to the principles of the present disclosure adjusts fuel injection in an engine based on a piston temperature. Fuel injection parameters that may be adjusted based on piston temperature include injection timing, injection pressure, injection location, and/or a number of injections per engine cycle. Injection timing is retarded, injection pressure is adjusted, injection location is adjusted and/or multiple injections per engine cycle are commanded when the piston temperature is less than a temperature threshold (e.g., a predetermined temperature). The piston temperature is estimated based on engine operating conditions such as engine speed, engine load, intake air temperature, engine coolant temperature, air/fuel ratio, and spark timing. The relationship between the piston temperature and the engine operating conditions may be developed under steady-state conditions (e.g., constant speed), and the piston temperature may be filtered using a lag filter to account for transient conditions.

Adjusting fuel injection as described herein when the piston temperature is less than the temperature threshold prevents fuel puddles form forming on piston surfaces. Preventing fuel puddles from forming on piston surfaces in an engine reduces the amount of particulate matter produced by the engine. Preventing fuel puddles from forming on piston surfaces may also prevent other negative effects such as oil dilution.

Figure 1:
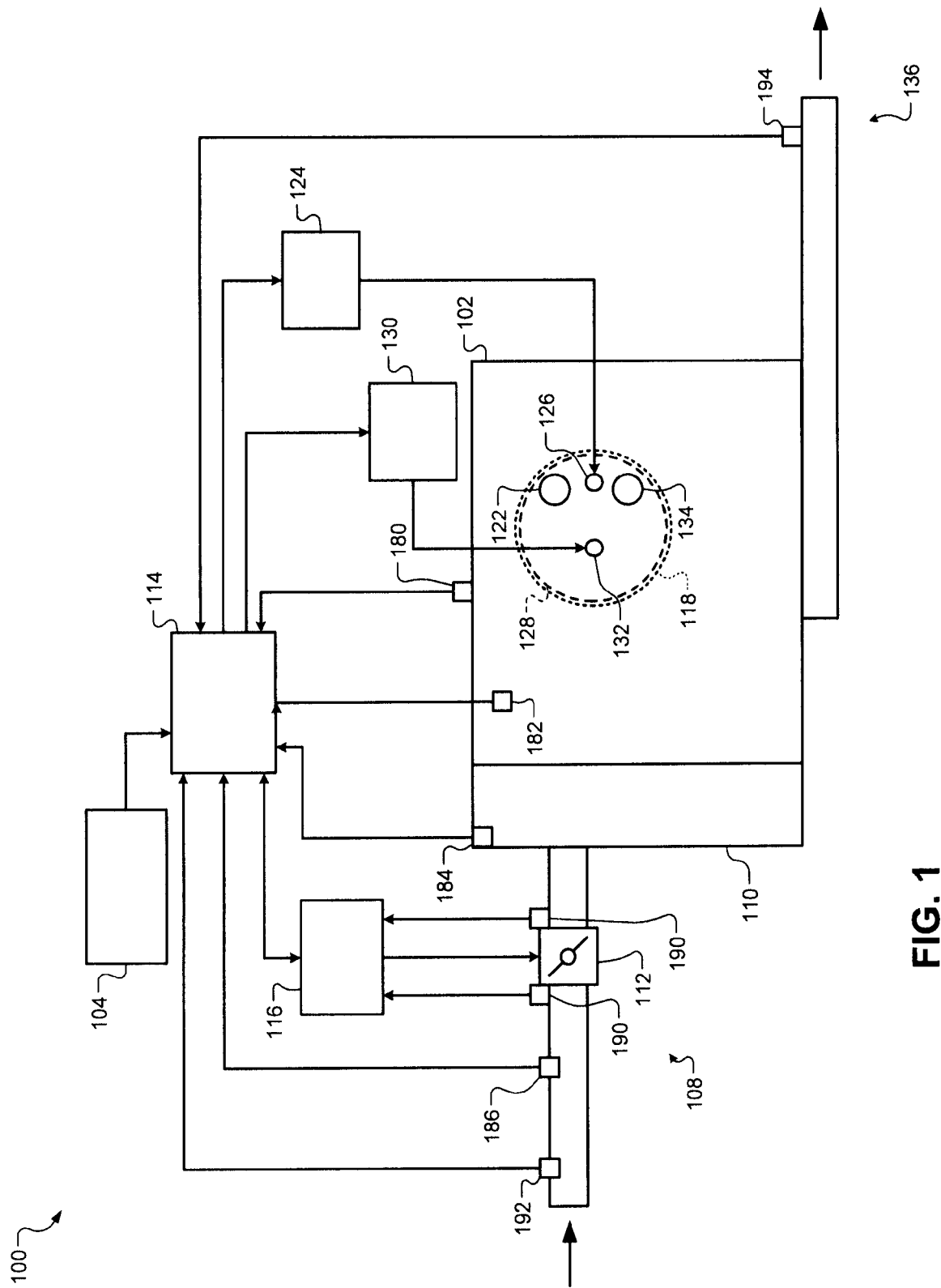
FIG. 1 is a functional block diagram of an example engine system according to the principles of the present disclosure.

Referring now to FIG. 1, a functional block diagram of an example engine system 100 is presented. The engine system 100 includes an engine 102 that combusts an air/fuel mixture to produce drive torque for a vehicle based on driver input from a driver input module 104. The driver input includes an accelerator pedal position and/or a cruise control setting. The cruise control setting is received from a cruise control system, which may be an adaptive cruise control system that varies vehicle speed to maintain a predetermined following distance.

Air is drawn into the engine 102 through an intake system 108. The intake system 108 includes an intake manifold 110 and a throttle valve 112, which may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates a fuel injector 126 to achieve a desired air/fuel ratio. As presently shown, the fuel injector 126 injects fuel directly into the cylinders. Additionally or alternatively, fuel may be injected into mixing chambers associated with the cylinders. Additionally, fuel may be injected into the intake manifold 110 at a central location or at multiple locations, such as near the intake valve 122 of each of the cylinders. The fuel actuator module 124 may halt injection of fuel to cylinders that are deactivated.

During the compression stroke, a piston 128 within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine (e.g., a spark ignition direct injection (SIDI) engine), in which case a spark actuator module 130 energizes a spark plug 132 in the cylinder 118 based on a signal from the ECM 114, which ignites the air/fuel mixture. The timing of the spark may be specified relative to the time when the piston is at its topmost position, referred to as top dead center (TDC).

The spark actuator module 130 may be controlled by a timing signal specifying how far before or after TDC to generate the spark. Because piston position is directly related to crankshaft rotation, operation of the spark actuator module 130 may be synchronized with crankshaft angle. In various implementations, the spark actuator module 130 may halt provision of spark to deactivated cylinders.

Generating the spark may be referred to as a firing event. The spark actuator module 130 may have the ability to vary the timing of the spark for each firing event. The spark actuator module 130 may even be capable of varying the spark timing for a next firing event when the spark timing signal is changed between a last firing event and the next firing event. In various implementations, the engine 102 may include multiple cylinders and the spark actuator module 130 may vary the spark timing relative to TDC by the same amount for all cylinders in the engine 102.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 134. The byproducts of combustion are exhausted from the vehicle via an exhaust system 136.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 is measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 is measured using a mass air flow (MAF) sensor 186. In various implementations, the MAF sensor 186 may be located in a housing that also includes the throttle valve 112.

The throttle actuator module 116 monitors the position of the throttle valve 112 using one or more throttle position sensors (TPS) 190. The ambient temperature of air being drawn into the engine 102 is measured using an intake air temperature (IAT) sensor 192. The air/fuel ratio of exhaust gas output by the engine 102 is measured using an air/fuel ratio (AFR) sensor 194. The ECM 114 uses signals from the sensors to make control decisions for the engine system 100. For example, the ECM 114 estimates a piston temperature and adjusts injection timing, injection pressure, injection location, and/or a number of injections per engine cycle based on the piston temperature.

Figure 2:
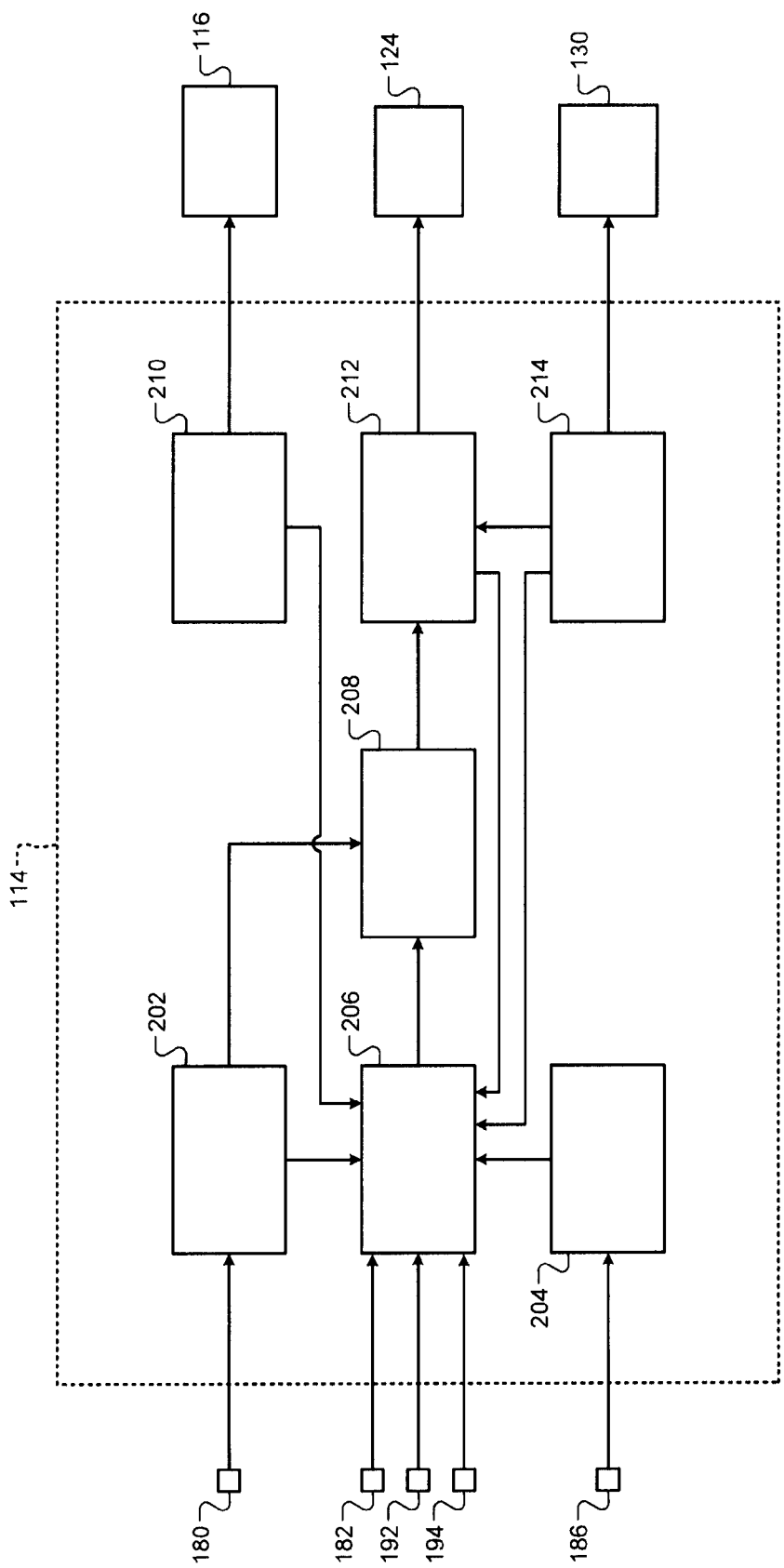
FIG. 2 is a functional block diagram of an example engine control system according to the principles of the present disclosure.

Referring now to FIG. 2, an example implementation of the ECM 114 includes a speed determination module 202, a load determination module 204, a temperature estimation module 206, and a temperature filter module 208. The speed determination module 202 determines the engine speed based on input from the CKP sensor 180. For example, the speed determination module 202 may calculate the engine speed based on a period that elapses as the crankshaft completes one or more revolutions. The speed determination module 202 outputs the engine speed.

The load determination module 204 determines the engine load based on input from the MAF sensor 186. The load determination module 204 may determine an amount of airflow per cylinder based on the mass flow rate of air and the number of cylinders in the engine 102. The engine load may be directly proportional to the amount of airflow per cylinder. The load determination module 204 outputs the engine load.

The temperature estimation module 206 estimates a piston temperature based on engine operating parameters. The engine operating parameters may include the engine speed, the engine load, the intake air temperature, the engine coolant temperature, an air/fuel ratio, and/or spark timing. The air/fuel ratio and/or the spark timing may be associated with all of the cylinders in the engine 102 and/or the single cylinder with which the piston temperature is associated.

The temperature estimation module 206 may receive the air/fuel ratio from the AFR sensor 194. Additionally or alternatively, the temperature estimation module 206 may determine the air/fuel ratio based on input received from a throttle control module 210 and a fuel control module 212. The input received may include a desired throttle area and a desired pulse width. The temperature estimation module 206 determines the spark timing based on input received from a spark control module 214. The input received may include a desired spark timing.

The temperature estimation module 206 may estimate the piston temperature based on the engine operating conditions using a predetermined relationship. The predetermined relationship may be embodied in a mathematical model and/or a lookup table. The predetermined relationship may apply weight factors to the engine operating conditions. The weight factors applied to some of the engine operating conditions (e.g., engine speed, engine load, air/fuel ratio) may be greater than the weight factors applied to the other engine operating conditions (e.g., intake air temperature, spark timing).

The predetermined relationship may be developed when the engine 102 is operating in steady-state conditions. The engine 102 may operate in steady-state conditions when the engine 102 is warm (e.g., at an operating temperature) and/or is operating at a relatively constant speed. The piston temperature that is estimated using the predetermined relationship may be referred to as a steady-state temperature. The temperature estimation module 206 outputs the steady-state piston temperature.

The temperature filter module 208 filters the piston temperature using a lag filter to account for the engine 102 operating in transient conditions. The engine 102 may operate in transient conditions when the engine 102 is cold (e.g., at a temperature that is less than the operating temperature) and/or when the engine 102 is rapidly accelerating or decelerating. When the engine 102 operates in transient conditions, the piston temperature may not change as rapidly as the engine operating conditions change. Thus, the lag filter may be used to account for differences between a change rate of the piston temperature and change rate(s) of the engine operating conditions. The filtered piston temperature may be referred to as a transient temperature.

The temperature filter module 208 may filter the piston temperature using a first order lag filter. For example, the temperature filter module 208 may determine the filtered piston temperature (Tf)pres in a present iteration using the following equation:

$$(T_f)_{pres} = (T_f)_{prev} + k^*[(T_{ss})_{pres} - (T_f)_{prev}] \quad (1)$$

where $(T_f)_{prev}$ is a filtered temperature determined in a previous iteration, k is a constant, and $(T_{ss})_{pres}$ is the steady-state temperature determined in the present iteration. The constant k may be a predetermined value between zero and one, inclusive.

The lag filter may be developed through modeling, testing, and/or calibration. The lag filter may be adjusted based on operating conditions of the engine system 100. For example, the constant k may be adjusted based on the engine speed and/or an iteration loop rate of the ECM 114. In various implementations, the constant k is directly proportional to the engine speed and the iteration loop rate of the ECM 114. The temperature filter module 208 outputs the piston temperature as filtered.

The fuel control module 212 controls injection timing, injection pressure, injection location, and/or a number of injections per engine cycle based on the piston temperature. The fuel control module 212 may retard the injection timing, adjust the injection pressure, adjust the injection location, and/or command multiple injections per engine cycle when the piston temperature is less than a temperature threshold. The fuel control module 212 may adjust the injection location by switching from injecting fuel via port injection and direct injection to injecting fuel via port injection only. The fuel control module 212 may stop retarding the injection timing, inject fuel via direct injection, and/or command a single injection per engine cycle when the piston temperature is greater than the temperature threshold.

The fuel control module 212 outputs a desired pulse width. The fuel control module 212 may determine a desired pulse width based on a driver torque request, which may be determined based on the driver input. When the fuel control module 212 commands multiple injections per engine cycle, the fuel control module 212 may divide the desired pulse width by the number of injections to obtain a pulse width per injection.

The fuel control module 212 also outputs a desired crank angle, which is a crank angle corresponding to a time when a start of injection is desired. The fuel control module 212 may adjust the desired crank angle to inject fuel into the cylinder 118 when the piston 128 is completing an intake stroke. Thus, the desired crank angle may be specified in number of degrees before TDC. When the fuel control module 212 retards the injection timing, the fuel control module 212 may decrease the desired crank angle to delay the start of injection.

The throttle control module 210 instructs the throttle actuator module 116 to regulate the throttle valve 112 based on the desired throttle area. The fuel control module 212 instructs the fuel actuator module 124 to regulate the fuel injector 126 based on the desired pulse width and the desired crank angle. The spark control module 214 instructs the spark actuator module 130 to regulate the spark plug 132 based on the desired spark timing.

Figure 3:
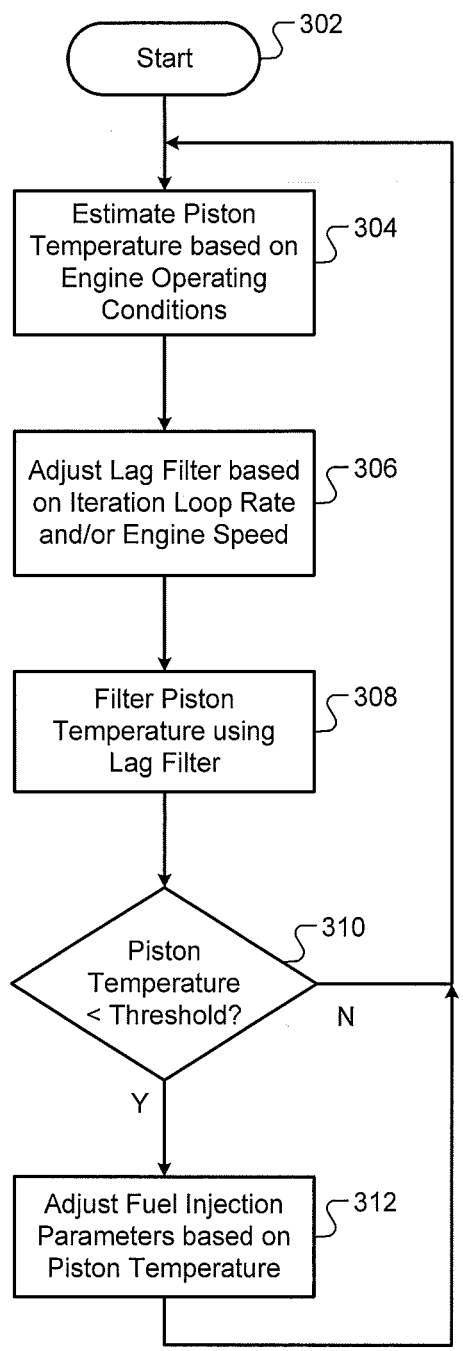
FIG. 3 is a flowchart illustrating an example engine control method according to the principles of the present disclosure.

Referring now to FIG. 3, a method for adjusting injection timing and/or a number of injections based on a piston temperature begins at 302. At 304, the method estimates the piston temperature based on engine operating conditions. The engine operating conditions may include engine speed, engine load, intake air temperature, engine coolant temperature, air/fuel ratio, and/or spark timing. The method may estimate the piston temperature based on a predetermined relationship between the engine operating conditions and the piston temperature. The predetermined relationship may be embodied in a mathematical model and/or a lookup table. The predetermined relationship may be developed when an engine is operating in steady-state conditions.

At 306, the method adjusts a lag filter based on an iteration loop rate and/or engine speed. The lag filter may be a first order filter such as the first order filter represented by equation (1) discussed above. The method may adjust the constant k based on the iteration loop rate and/or the engine speed. For example, the method may increase the constant k when the iteration loop rate increases and/or when the engine speed increases. At 308, the method filters the piston temperature using the lag filter.

At 310, the method determines whether the piston temperature is less than a temperature threshold. If the piston temperature is less than the temperature threshold, the method continues at 312. Otherwise, the method continues at 304. At 312, the method adjusts fuel injection parameters based on the piston temperature. For example, the method may retard injection timing, adjust injection pressure, adjust injection location, and/or command multiple injections per engine cycle. The method may adjust the injection location by switching from injecting fuel via port injection and direct injection to injecting fuel via port injection only. The method may stop retarding the injection timing, inject fuel via direct injection and/or command a single injection per engine cycle when the piston temperature is greater than the temperature threshold.

Figure 4:
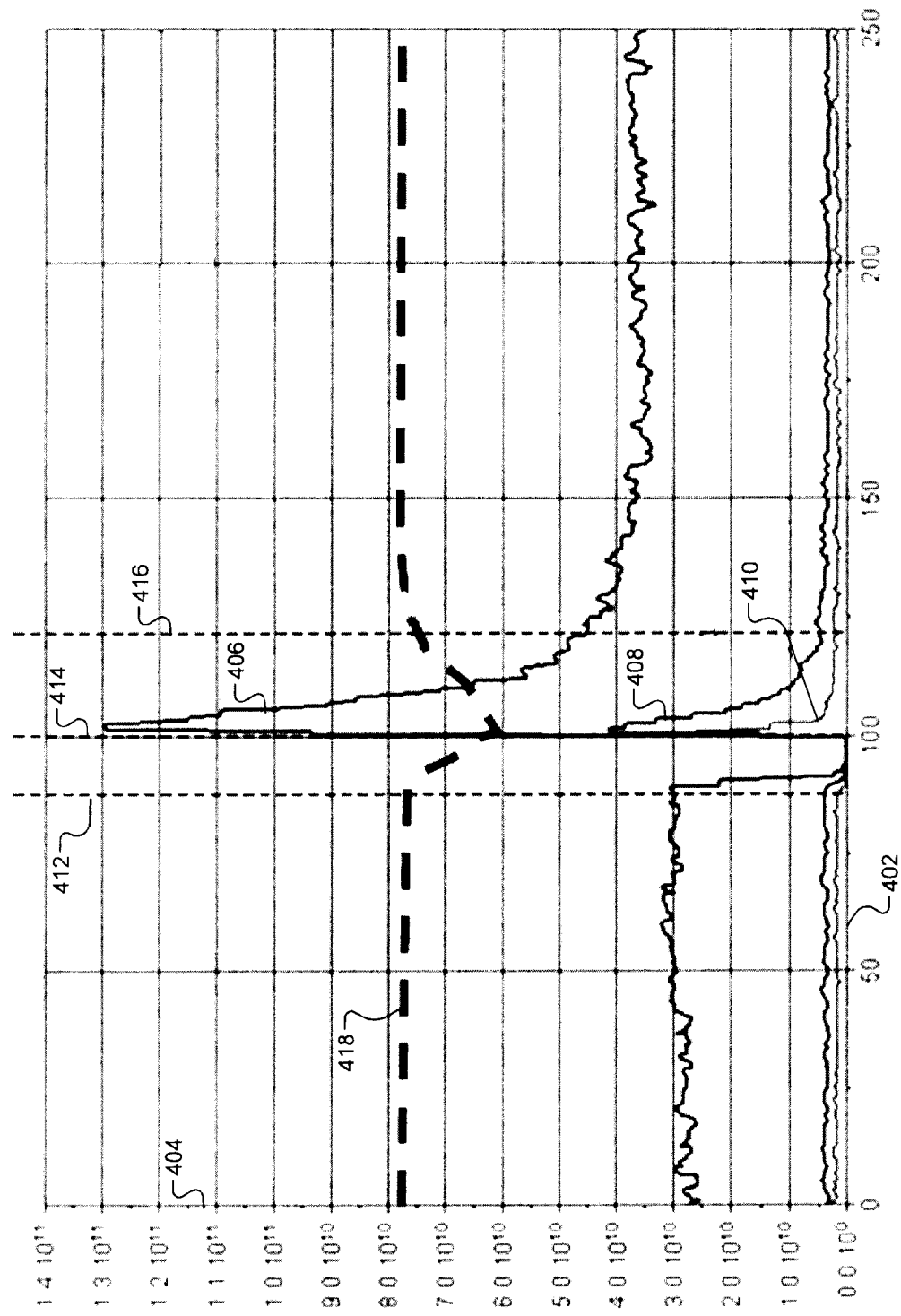
FIG. 4 is a graph illustrating levels of particulate matter output corresponding to different injection timing strategies, as well as a corresponding piston temperature.

Referring now to FIG. 4, the relationship between injection timing and the amount of particulate matter produced by a spark ignition direct injection (SIDI) engine is illustrated. An x-axis 402 represents time in seconds and a y-axis 404 represents particulate levels in part per million (ppm). A first particulate level 406, a second particulate level 408, and a third particulate level 410 correspond to a first injection timing, a second injection timing, and a third injection timing, respectively.

At 412, fuel injection in the SIDI engine is stopped. Fuel injection may be stopped when a vehicle is decelerating to improve fuel economy. At 414, fuel injection is restarted. Between 414 and 416, the first injection timing, the second injection timing, and the third injection timing are retarded to yield start-of-injection (SOI) angles of 310 degrees before TDC, 270 degrees before TDC, and 220 degrees before TDC, respectively. At 416, the first, second, and third injection timing are returned to normal.

A piston temperature 418 starts to decrease at 412 when fuel injection in the SIDI engine is stopped. Thus, when fuel injection is restarted, fuel contacts cold pistons in the SIDI engine, which causes a spike in the particulate matter levels 406, 408, 410. As FIG. 4 illustrates, the magnitude of the spike may be decreased by retarding the injection timing of the SIDI engine. For example, the third injection timing is retarded relative to the first injection timing and the spike in the third particulate level 410 is less than the spike in the first particulate level 406.

The piston temperature 418 starts to increase at 414 when fuel injection is restarted. The data illustrated in FIG. 4 corresponds to an engine speed of 2,000 revolutions per minute, a brake mean effective pressure of 7 bars, and an engine coolant temperature of 54 degrees Celsius. The piston temperature 418 may be determined by analysis and/or by lab tests placing a thermocouple on a piston surface.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
   a temperature estimation module that estimates a piston temperature associated with a cylinder based on engine operating conditions; and
   a fuel control module that controls at least one of an injection pressure associated with the cylinder, an injection location associated with the cylinder, and a number of injections per engine cycle associated with the cylinder based on the piston temperature.

2. The system of claim 1 wherein the fuel control module controls an injection timing associated with the cylinder, the injection pressure associated with the cylinder, the injection location associated with the cylinder, and the number of injections per engine cycle associated with the cylinder based on the piston temperature.

3. A system comprising:
   a temperature estimation module that estimates a piston temperature associated with a cylinder based on engine operating conditions; and
   a fuel control module that controls at least one of an injection timing associated with the cylinder, an injection pressure associated with the cylinder, an injection location associated with the cylinder, and a number of injections per engine cycle associated with the cylinder based on the piston temperature, wherein the fuel control module commands multiple injections per engine cycle when the piston temperature is less than a predetermined temperature.

4. The system of claim 3 wherein the fuel control module retards the injection timing when the piston temperature is less than a predetermined temperature.

5. The system of claim 3 wherein the temperature estimation module estimates the piston temperature based on engine speed, engine load, and an air/fuel ratio.

6. The system of claim 4 wherein the piston temperature is directly proportional to the engine speed, the engine load, and the air/fuel ratio.

7. The system of claim 3 further comprising a temperature filter module that filters the piston temperature using a lag filter.

8. The system of claim 7 wherein the lag filter is a first order lag filter.

9. The system of claim 7 wherein the temperature filter module adjusts the lag filter based on at least one of engine speed and an iteration loop rate.

10. The system of claim 9 wherein the piston temperature is adjusted at a first rate that is directly proportional to the at least one of the engine speed and the iteration loop rate.

11. A system comprising:
    a temperature estimation module that estimates a piston temperature associated with a cylinder based on engine operating conditions; and
    a fuel control module that controls at least one of an injection timing associated with the cylinder, an injection pressure associated with the cylinder, an injection location associated with the cylinder, and a number of injections per engine cycle associated with the cylinder based on the piston temperature, wherein the temperature estimation module estimates the piston temperature based on engine speed, engine load, and an air/fuel ratio, intake air temperature, engine coolant temperature, and spark timing.

12. A method comprising:
    estimating a piston temperature associated with a cylinder based on engine operating conditions; and controlling at least one of an injection pressure associated with the cylinder, an injection location associated with the cylinder, and a number of injections per engine cycle associated with the cylinder based on the piston temperature.

13. The method of claim 12 further comprising controlling an injection timing associated with the cylinder, the injection pressure associated with the cylinder, the injection location associated with the cylinder, and the number of injections per engine cycle associated with the cylinder based on the piston temperature.

14. A method comprising:
    estimating a piston temperature associated with a cylinder based on engine operating conditions;
    controlling at least one of an injection timing associated with the cylinder, an injection pressure associated with the cylinder, an injection location associated with the cylinder, and a number of injections per engine cycle associated with the cylinder based on the piston temperature; and
    commanding multiple injections per engine cycle when the piston temperature is less than a predetermined temperature.

15. The method of claim 14 further comprising retarding the injection timing when the piston temperature is less than a predetermined temperature.

16. The method of claim 14 further comprising estimating the piston temperature based on engine speed, engine load, and an air/fuel ratio.

17. The method of claim 16 wherein the piston temperature is directly proportional to the engine speed, the engine load, and the air/fuel ratio.

18. The method of claim 14 further comprising filtering the piston temperature using a lag filter.

19. The method of claim 18 wherein the lag filter is a first order lag filter.

20. The method of claim 18 further comprising adjusting the lag filter based on at least one of engine speed and an iteration loop rate.

21. The method of claim 20 wherein the piston temperature is adjusted at a first rate that is directly proportional to the at least one of the engine speed and the iteration loop rate.

22. A method comprising:
    estimating a piston temperature associated with a cylinder based on engine operating conditions;
    controlling at least one of an injection timing associated with the cylinder, an injection pressure associated with the cylinder, an injection location associated with the cylinder, and a number of injections per engine cycle associated with the cylinder based on the piston temperature; and
    estimating the piston temperature further based on engine speed, engine load, and an air/fuel ratio, intake air temperature, engine coolant temperature, and spark timing.

* * * * *